(No Model.) 4 Sheets—Sheet 3.

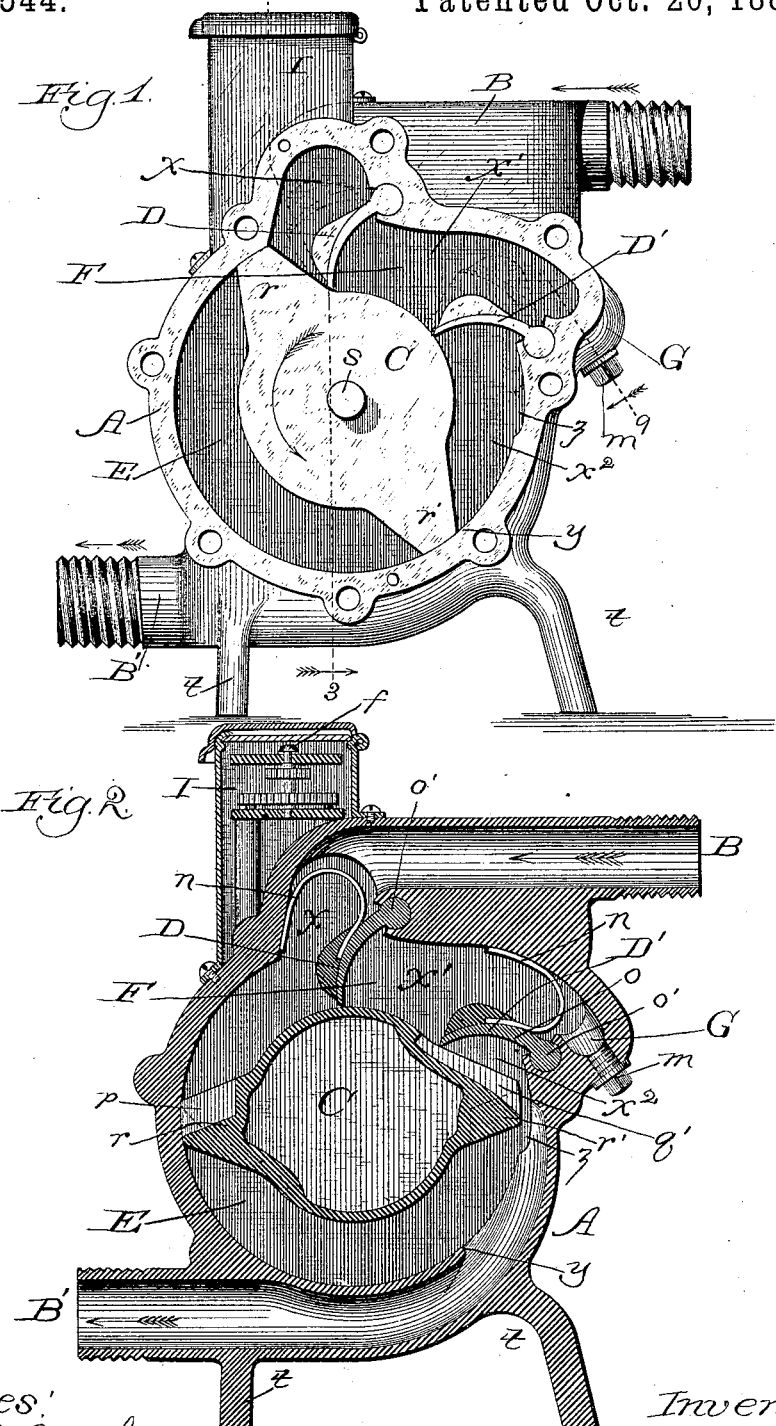

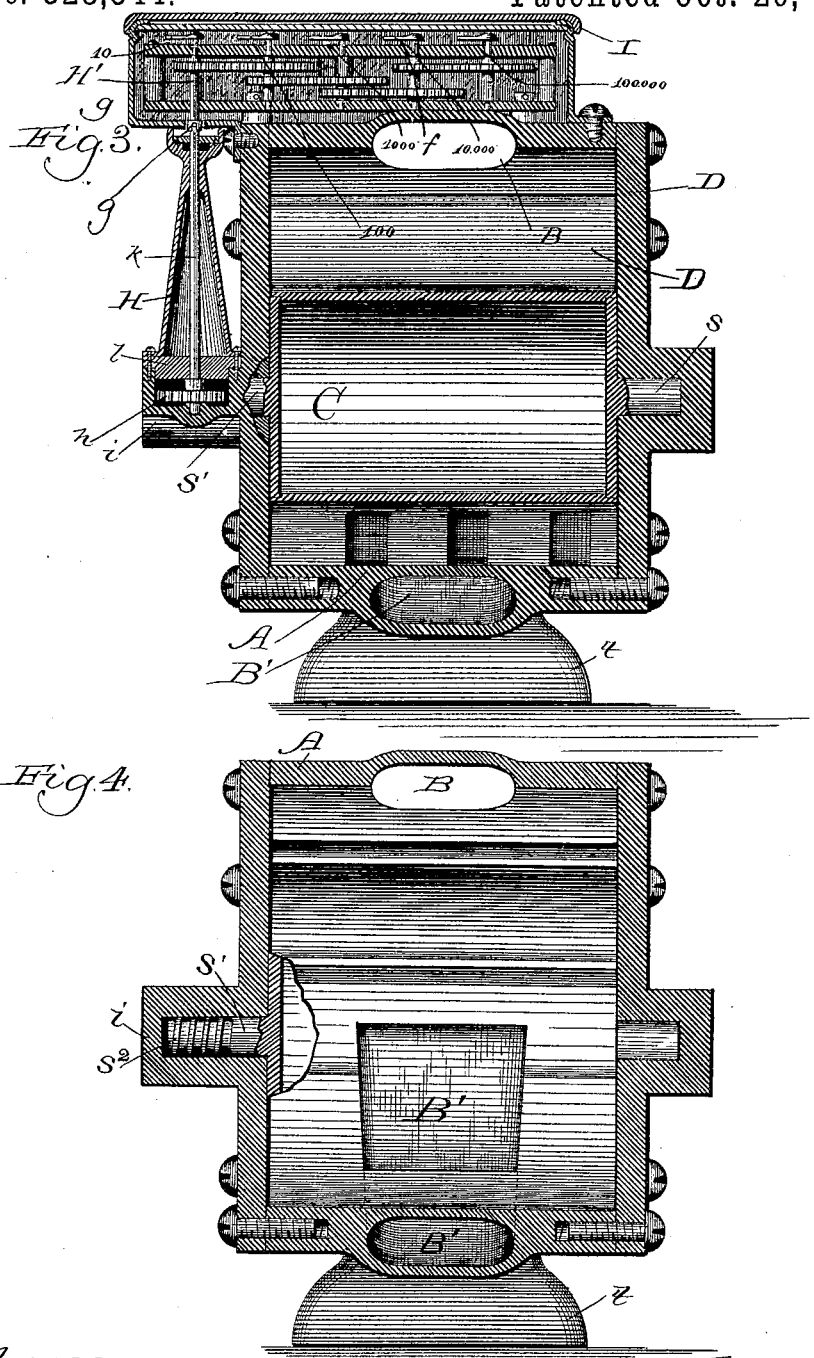

F. W. TUERK, Jr.
ROTARY WATER METER.

No. 328,544. Patented Oct. 20, 1885.

Witnesses:
Chas. E. Gaylord
Mason Bross.

Inventor:
Frederick W. Tuerk, Jr.
By Dyrenforth & Dyrenforth,
Attorneys.

N. PETERS. Photo-Lithographer, Washington, D. C.

(No Model.) 4 Sheets—Sheet 4.

F. W. TUERK, Jr.
ROTARY WATER METER.

No. 328,544. Patented Oct. 20, 1885.

Witnesses:
Chas. E. Gaylord
Mason Bross.

Inventor:
Frederick W. Tuerk, Jr.
By Dyrenforth and Dyrenforth,
Attorneys.

N. PETERS, Photo-Lithographer, Washington, D. C.

UNITED STATES PATENT OFFICE.

FREDERICK W. TUERK, JR., OF CHICAGO, ILLINOIS.

ROTARY WATER-METER.

SPECIFICATION forming part of Letters Patent No. 328,544, dated October 20, 1885.

Application filed December 18, 1884. Serial No. 150,615. (No model.)

*To all whom it may concern:*

Be it known that I, FREDERICK W. TUERK, Jr., a citizen of the United States, residing at Chicago, in the county of Cook and State of Illinois, have invented a certain new and Improved Water-Meter; and I hereby declare the following to be a full, clear, and exact description of the same.

It is my object to provide a meter of simple construction which shall operate accurately to measure the quantity of water or other liquid passed through it at any perceptible degree of pressure, and in which the parts may be readily removed for repair and replaced, with the loss of but little time, by unskilled or inexperienced hands, thus avoiding the necessity of removing the device from its position.

It is further my object to make the movable parts self-packing by causing them to fit tightly without producing material loss of power and avoiding a pinching or cramping motion; and it is still further my object to cause the registering mechanism to be acted upon by the meter directly and positively to insure accurate registration of the quantity of liquid passed through the meter.

To these ends my invention consists in providing a suitable shell having an inlet and an outlet and containing a piston arranged to be rotated by the pressure of the water introduced, and suitable registering mechanism connected in a peculiar manner with the piston to indicate the quantity of water passed through the device.

My invention further consists in providing hinged partitions to engage with the piston, and with the piston divide the shell of the device into adjustable compartments; and my invention still further consists in certain details of construction and combinations of parts, all as hereinafter particularly set forth.

Figure 5:
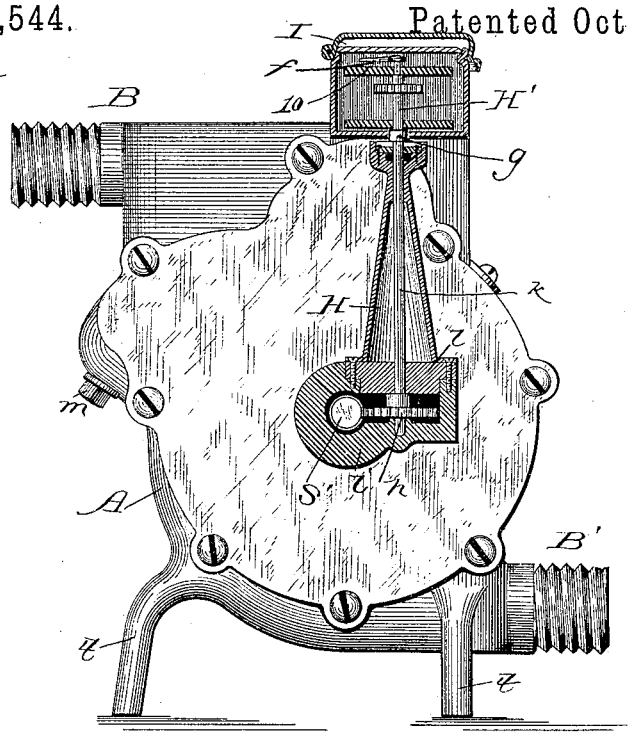
Figure 6:
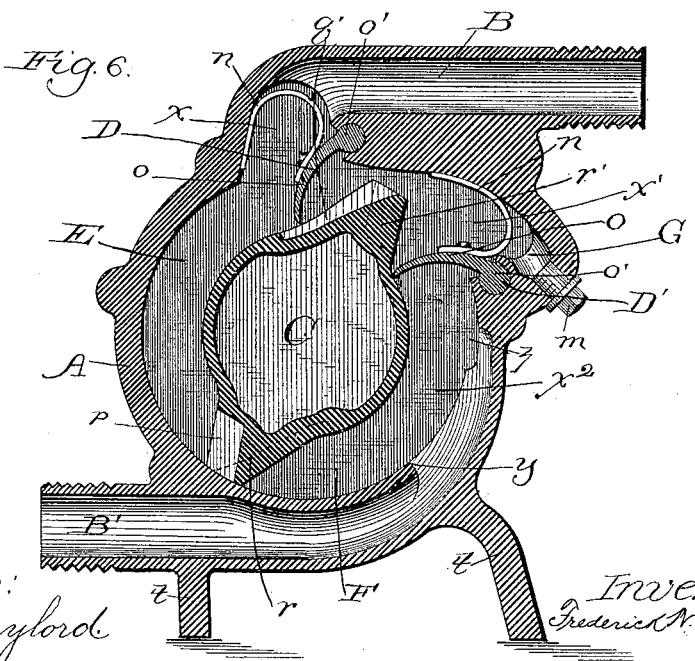
Figure 7:
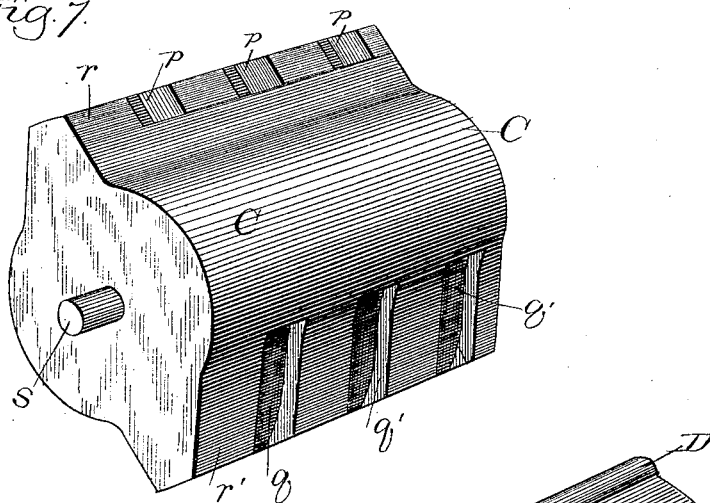
Figure 8:
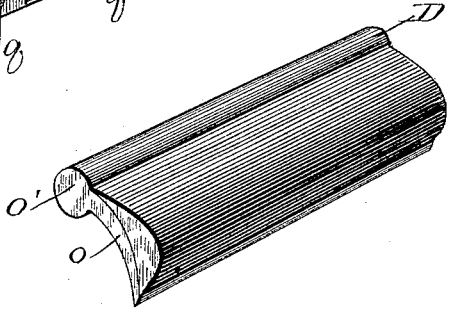

Referring to the drawings, Figure 1 is an end elevation of my improved meter, having the end plate removed to display the construction of the internal parts; Fig. 2, a vertical cross-section of the device, showing the piston in a different position from that shown in Fig. 1, and representing the registering mechanism in elevation; Fig. 3, a longitudinal section taken on the line 3 3 of Fig. 1, and viewed in the direction of the arrow-heads; Fig. 4, a similar view to that shown in Fig. 3, with the piston, hinged partitions, and registering mechanism removed to show the internal construction of the shell and representing a worm on the journal upon a broken piece of the piston, by means of which worm the registering mechanism is actuated to indicate the number of revolutions of the piston; Fig. 5, an end elevation showing the side opposite to that represented in Fig. 1, and showing in section the connection between the piston and registering mechanism; Fig. 6, a similar view to that shown in Fig. 2, but representing the piston in a different position; Fig. 7, a perspective view of the piston; Fig. 8, a perspective view of a hinged swinging partition, and Fig. 9 a sectional view on the line 9 9 of Fig. 1, showing a recess or pocket to receive sand and other sediment contained in the water, and means for opening and closing the pocket.

A is the shell of the device, having a partly-circular interior, and supported upon suitable legs, $t$.

B is the water-inlet, formed on the upper side of the shell, and culminating within the latter beyond a point above its center, and B' is the water-outlet, extending from one of the inner sides of the shell, diagonally opposite the inner opening of the inlet B, out beyond the opposite side.

C is a rotary hollow piston, closed at each end, and provided with journals $s$ and $s'$, and resembling in form a cylinder having wedge-shaped lateral projections or flanges $r$ and $r'$ on opposite sides of the cylindrical portion of the piston. The lateral diameter of the piston C is such as to cause the outer surfaces of the wedge-shaped flanges $r$ and $r'$ to extend against opposite sides of the internal circular portion of the shell A. The flange $r'$ is provided with transverse rectangular recesses $q'$, which extend from its extreme edge for a short distance into the surface of the circular portion of the shell, and directly opposite each recess $q'$, and in line with it, upon the flange $r$, a shorter recess, $p$, is formed, extending backward upon the surface of the flange. (See Fig. 7.) The opposite side of the flange $r'$ is provided with recesses similar in form and appearance to the recesses $p$ on the flange $r$, but made to occupy a position opposite the spaces between the recesses $q'$, and the opposite side of the flange $r$ is provided with recesses similar in form and appearance to the recesses $q'$ on the flange $r'$, but in line with the shorter recesses formed upon the opposite side of the flange $r'$. The purpose of this particular arrangement is hereinafter described.

D and D' are hinged partitions, comprising each the part $o$, curved in form, as shown, and the part $o'$, similar to the knuckle of a hinge, but solid and fitting into a longitudinal recess formed to receive it in the enlarged portion of the shell A. The free edges of the partitions are maintained in contact with the surface of the piston C by the employment of a suitable spring, $u$, for each, or by weighting the parts $o$, as shown, or, if desired, by both means, because, in the revolution of the piston C, if the recesses $q'$ on both sides thereof were formed in line with each other, and the recesses $p$ similarly formed, the frictional wear upon the edges of the leaves $o$ would be uneven. This is obviated by the arrangement of the recesses $q'$ and $p$, hereinbefore set forth.

The operation of the parts of the device thus far described is as follows: Suppose, for the sake of illustration, that the piston C, in starting the device by connecting the inlet B with a hydrant or other water-supply, occupies the position shown in Fig. 1 of the drawings, when the piston will have divided the interior of the shell A into chambers E and F, the latter of which is subdivided by the partitions D and D' into chambers $x$, $x'$, and $x^2$, all of which chambers are closed, except the chamber $x^2$, from which latter the water-outlet B' leads. Water introduced into the chamber $x$ will pack the partition D tightly against the surface of the piston, which will be rotated by the pressure of the stream against the flange $r$ (the convex side of the partition D acting at the same time in the manner of a cylinder-head in connection with a reciprocating piston-head) until it shall have reached nearly the position shown in Fig. 6, (when the chamber $x$ will have coalesced with the chamber E,) when the rear edges of the recesses $q'$ will have become exposed to the chamber $x$, permitting water from this chamber to enter through them into the chamber $x'$, filling the latter. The pressure of water within the chamber E, Fig. 6, against the flange $r$ will continue to rotate the piston $c$, since the pressure within the chamber $x'$ will have become equal to that in the chamber $x$, and will thus be counterbalanced on both sides of the flange $r'$. In the relative portions of the parts just described the convex surface of the partition D' will, like that of the partition D in the position hereinbefore described, act like a cylinder-head in connection with a reciprocating piston-head, while the partition D will have become an idler, raised by following the surface of the piston C. By the time the flange $r$ of the piston shall have reached beyond the point $y$ the water in the chamber E will discharge through the outlet B', and the flange $r'$ will have cleared the partition D, again forming the compartment $x'$ into a closed chamber, in which the water it contains is stationary between the partitions D and D', which then adjust themselves around the circular portion of the piston, as shown in Fig. 1, the former of which again acts like a cylinder-head in connection with a reciprocating piston, and whereby the force of the water is exerted against the flange $r'$ to continue the revolution of the piston. When the piston shall have reached the position shown in Fig. 2, the rear extremities of the recesses $q'$ in the flange $r'$ will have become exposed to the chamber $x'$, permitting a portion of the water contained therein, equal to the decrease of the area of the chamber $x'$ produced by the rise of the partition D' in following the surface of the piston-projection $r'$, to discharge over the edge of the latter into the chamber $x^2$, the shell A being recessed, as shown at $z$, to permit the passage of water between it and the piston. The discharge over the edge of the flange $r'$ is checked by the contact of its edge with the partition D', at which point the decreasing of the area of the chamber $x'$ will have ceased and its increase will take place by the falling of the partition D' upon the bulging portion of the cylinder, during which fall of the partition D' the amount of water which will have escaped from the chamber $x'$ into the chamber $x^2$ will return from the latter through the recesses $p$ into the chamber $x'$, owing to the increase of the area of the latter to its former dimensions. Continued rotation of the piston will expose the rear edges of the recesses $q'$ in the flange $r'$ to the chamber $x$, when the operations above described will be continued as long as water is withdrawn through the meter, which is thenceforward continually filled.

It will be seen that the piston and partitions are self-packing within the shell A, and that the wear, which takes place evenly upon the edges of the swinging partitions, will cause them to act lower down upon the piston without changing the measuring capacity.

Figure 9:
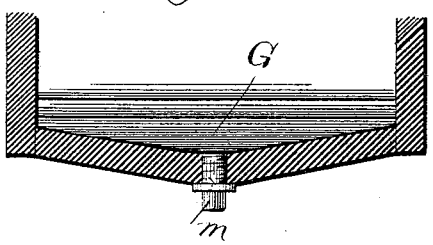

A chamber, G, concave in form, as shown in Fig. 9, is provided in the enlarged portion of the shell to receive sand and other sediment contained in the water, which substances may from time to time be removed on withdrawing the screw-plug $m$.

To actuate the registering mechanism to measure and register the quantity of water passed through the meter, mechanism is provided, of which the following is a description:

H, Fig. 3, is a hollow extension projecting upward from the bearing of the piston-journal $s'$, to which it is firmly secured upon the edges of an opening formed therein, which opening is closed by an annular plate, $l$, by means of screws passing through a lateral flange formed upon the lower edge of the extension H through the plate $e$, and into the seat upon which the plate $e$ rests. A vertical rod, $k$, stands centrally within the extension H, projecting at its lower end into a chamber on one side of the journal-bearing $i$, when it is provided with a pinion, $h$, in mesh with the worm $s^2$ upon the journal $s'$. The upper extremity of the rod H is provided with a pin, $g$, inserted transversely through it, to be received within slots formed in the lower extremity of the hollow extension H' of the rod H, a common contrivance in meters to cause the two parts of the rod to rotate together and permit ready removal and adjustment of the registering mechanism covered by a case, I, supported upon the shell A, and containing the registering mechanism, hereinafter described, and through the bottom of which the extension H' of the rod H projects.

The registering mechanism above referred to is one of common construction for the same and analogous purposes to which the present invention is applied, and does not therefore require accurate description. The dial-fingers $f$ point to figures upon dials viewed through a glass covering over the case I, and the mechanism operating the index-fingers is arranged to cause them to indicate in the smaller devices from units upward in decimal order to any desired figure, and in larger devices from a larger number than units to start with.

In the apparatus illustrated in the drawings, of which Fig. 3 most clearly displays the registering mechanism, if the capacity of the shell, with the piston and partitions therein, shall be, say, one-thirtieth of a cubic foot, the pinion $h$ will be provided with thirty leaves, whereby thirty revolutions of the piston will rotate the rod $k$ once, and cause the first dial-finger $f$ to register one revolution and indicate one cubic foot.

The advantage over the pawl and ratchet mechanism found in other meters, obtained by causing the worm $s^2$ to act directly upon the registering-gear, is that, owing to the direct connection and consequent positive action, the number of revolutions of the piston must be correctly registered.

A meter of the construction above set forth will permit the passage through it of a regularly even stream, which will afford but comparatively little obstruction to the outlet, and thus almost entirely avoid the loss of pressure.

What I claim as new, and desire to secure by Letters Patent, is—

1. A meter comprising in combination a suitable shell having an inlet and an outlet, a cylindrical piston within the said shell having two wedge-shaped lateral flanges, $r$ and $r'$, opposite each other and arranged to be rotated by the pressure of liquid introduced through the said inlet, and suitable registering mechanism connected with the said piston to indicate the number of its revolutions, substantially as described.

2. A meter comprising in combination a suitable shell having an inlet and an outlet, a piston within the said shell to be rotated by the pressure of water introduced through the said inlet, hinged partitions within the said shell engaging with the said piston, and forming with the latter in its rotation closed and intercommunicating chambers, and suitable registering mechanism connected with the said piston to register the number of its revolutions, substantially as described.

3. A meter comprising in combination the following elements—viz., a shell, A, having an inlet, B, and an outlet, B', a recessed piston, C, supported to rotate within journal-bearings at opposite ends of the said shell, hinged partitions D and D', within the said shell, and having a tendency to be in continual contact at their free edges with the surface of the said piston, and registering mechanism connected with the said piston to register the number of its revolutions, the whole being constructed and arranged to operate substantially as and for the purpose set forth.

4. In a meter, the rotary piston C, provided on opposite sides with recessed flanges, substantially as and for the purpose set forth.

5. A water-meter comprising in combination the following elements—viz., a shell, A, having an inlet, B, and an outlet, B', and provided with a pocket, G, to receive sand and other sediment, and capable of being opened and closed, a recessed piston, C, supported to rotate within journal-bearings at opposite ends of the said shell, hinged partitions D and D', within the said shell, and having a tendency to be in continual contact at their free edges with the surface of the said piston, and registering mechanism connected with the said piston to register the number of its revolutions, the whole being constructed and arranged to operate substantially as described.

FREDERICK W. TUERK, JR.

In presence of—
EDWARD THORP,
MASON BROSS.